United States Patent [19]

Winter et al.

[11] Patent Number: 4,539,214

[45] Date of Patent: Sep. 3, 1985

[54] METHOD OF PRODUCING PASTA

[75] Inventors: Maurice J. Winter, Great Yarmouth; Peter R. Dawe, Norwich, both of England

[73] Assignee: Ranks Hovis McDougall p.l.c., Berkshire, England

[21] Appl. No.: 550,241

[22] Filed: Nov. 9, 1983

Related U.S. Application Data

[63] Continuation-in-part of Ser. No. 409,653, Aug. 19, 1982, abandoned, which is a continuation of Ser. No. 209,532, Nov. 24, 1980, abandoned.

[51] Int. Cl.³ .............................................. A23L 1/16
[52] U.S. Cl. .................................... 426/557; 426/451; 426/511
[58] Field of Search ............... 426/557, 458, 516, 510, 426/511, 451

[56] References Cited

U.S. PATENT DOCUMENTS

| | | | |
|---|---|---|---|
| 3,537,862 | 11/1970 | Peters et al. | 426/510 |
| 3,615,677 | 10/1971 | Scharschmidt et al. | 426/557 |
| 4,208,439 | 6/1980 | Hsu | 426/557 |
| 4,230,735 | 10/1980 | Yoshida et al. | 426/557 |

*Primary Examiner*—George Yeung
*Attorney, Agent, or Firm*—McCormick, Paulding & Huber

[57] ABSTRACT

A method of producing pasta which is rehydratable in under ten minutes by extruding a mixture of semolina and/or wheat flour and water having a moisture content of between 28% and 40% and cutting it into lengths to form a cut product having a wall thickness of between 0.3 and 0.7 mm and subjecting the product without expanding it to dry super-heated steam at 102° C. to 140° C., in the absence of water, for seven to twenty minutes.

2 Claims, 5 Drawing Figures

METHOD OF PRODUCING PASTA

CROSS-REFERENCE TO RELATED APPLICATIONS

This application is a Continuation-In-Part application of application Ser. No. 409,653, filed Aug. 19, 1982, abandoned, which in turn is a continuation application of application Ser. No. 209,532, filed Nov. 24, 1980, abandoned.

BACKGROUND OF THE INVENTION

This invention relates to a method of producing pasta and particularly to pasta which is rapidly rehydratable for consumption and which when so rehydrated has a desirable "al dente" eating texture. It also relates to pasta produced by the method. Such pasta may be in the form of tubes such as straight or elbow macaroni, noodles, spaghetti, vermicelli or other pasta shapes.

Conventionally pasta is made by mixing wheat flour or durum semolina and water. The product shape is formed by extrusion of the mixture through a die and the product is then dried under controlled temperature and humidity. Typically drying has been for six or more hours at temperatures of up to 75° C. and relative humidities up to 85%. This slow drying has been necessary to prevent cracking and checking in the product. Such products may be rehydrated by cooking in boiling water for any time from about ten minutes to twenty minutes. Prior to this cooking, that is prior to when the product is prepared for eating, the protein and starch of the product remain essentially in their natural states and no denaturation of the protein or gelatinization of the starch occurs until it is cooked. When conventional pasta (e.g., spaghetti) is cooked it is often thought desirable to cook it to a texture or state, usually referred to as "cooked to al dente", at which it is not soft but instead presents some resistance to the teeth to give it a degree of chewiness. When cooked to this "al dente" texture the pasta product throughout much of its body or bulk exhibits mainly denatured protein and gelatinized starch, but in a central core or zone a substantial amount of denaturized protein and ungelatinized starch remains.

A specific aim of the present invention is to provide a pasta product which can be rehydrated in a period of time much shorter than that required for rehydrating conventional pasta and which product after rehydration includes a central core or zone containing a substantial degree of denatured protein and ungelatinized starch giving the product an "al dente" texture.

DESCRIPTION

Figure 1:
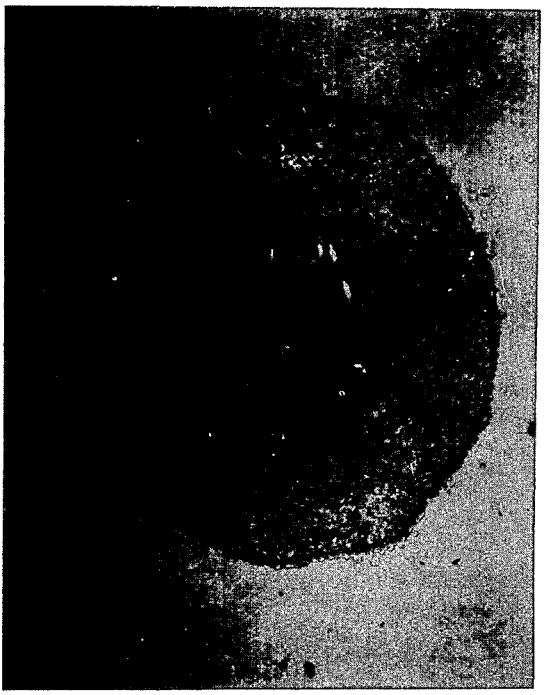
FIG. 1 is a photomicrograph taken under nonpolarized light showing a conventional spaghetti in cross section at x32 magnification cooked for five minutes.

According to the present invention there is provided a method of producing a rapidly rehydratable pasta which includes preparing a mixture of semolina and/or wheat flour and water, having a moisture content of between 28 and 40%, extruding the mixture through a die and cutting it into lengths, if necessary, to form a cut product, such as a spaghetti, macaroni, noodles or the like, having a thickness between 0.3 and 0.7 millimeters, and then simultaneously cooking and drying the cut product, to partially denature the protein of the cut product and to partially gelatinize the starch—that is, to denature most or all of the protein and to gelatinize most or all of the starch in a major portion of the bulk of the product while leaving an inner core or zone in which a substantial proportion of the protein remains undenatured and a substantial proportion of the starch remains ungelatinized—by subjecting the product to dry super-heated steam, in the absence of water, at a temperature of between 102° C. and 140° C. for from seven to twenty minutes. Between the forming of the cut product and the step of exposing it to super-heated steam the product may be surface dried slightly to prevent it from sticking together, but such surface drying reduces the overall moisture at the most by about 4% so that at the start of the simultaneous cooking and drying step the product still has an overall moisture content of between 24 and 40%. During the simultaneous cooking and drying step—that is, during its exposure to dry super-heated steam—the product has its moisture content reduced sufficiently to give a shelf-stable product without cracking and checking. Preferably, the thickness is about 0.45 mm and the moisture content at the end of the cooking and drying step is below 14%. In the case of a tubular product, the thickness is the wall thickness.

Prior to and during the step of simultaneously cooking and drying the cut product by the application of dry super-heated steam in the absence of water no additional processing, other than that already mentioned and having a significant effect on the structure or composition of the product, takes place. In particular, nothing is done to expand the product so that the cooking and drying takes place while the product remains in an unexpanded state. Also, at the end of the cooking and drying step the product is in its final form ready for packaging and no further cutting or other shaping of the product takes place. However, as an additional step after cooking and drying by superheated steam, the product may be gradually cooled before packaging to equilibrate the moisture level in the product.

With the method of the invention the processing time is substantially less than with prior art methods of producing a similar product, the time required for rehydrating the resulting product is considerably shorter than that required for cooking conventional pasta which requires cooking in boiling water for ten minutes, and the product when rehydrated exhibits an "al dente" or chewy texture due to some undenatured protein and some ungelatinized starch remaining in it.

EXAMPLE

Wheat flour and water are mixed to give a moisture content of 32%. The mixture is extruded using a conventional pasta press fitted with a thin walled die, and cut into lengths to produce a short cut macaroni with a wall thickness of approximately 0.5 mm.

The extrudate is surface dried in a conventional shaker pre-drier sufficiently to prevent the product sticking together. This is carried out at 30° C. for three minutes to reduce the moisture content from 32% to 28%.

The product is then placed on a conveyor which transports it continuously through an insulated tunnel in the absence of water. The tunnel is supplied with dry steam super-heated by means of gas burners to give a temperature of 110° C. The processing time is approximately ten minutes. During this steaming, the product is simultaneously cooked and dried with the drying effect taking it from the approximately 28% moisture content to a level at which the product is shelf-stable, i.e. below about 14% moisture content.

The product is then cooled and moisture equalibrated conventionally for sixty minutes at 56° C.

The method of the present invention provides conditions which, in the cooking that takes place during the application of dry super-heated steam, give partial denaturation of the protein and partial gelatinization of the starch and also prevent cracking and checking in the product. By partial denaturation and partial gelatinization it is meant that although a major portion of the protein and starch of the product is denatured and gelatinized, a significant amount remains undenatured and ungelatinized sufficient to give the product an "al dente" texture when rehydrated. Most of the unconverted starch and protein remains in a central core or zone. That is, when the cool uncooked pasta pieces are presented to the super-heated steam environment condensation appears on and evaporates from the product surfaces, and in conjunction with the specific thickness of the product, the temperature of the steam, and the duration of the product's exposure to the steam the product is cooked and dried in such a way as to cause the finished product to have an outer zone, in which most or all of the protein is denatured and in which most or all of the starch is gelatinized and to have an inner core or zone in which a substantially greater proportion, in comparison to the outer zone, of the protein remains undenatured and the starch ungelatinized, with the finished product also having an overall moisture content of less than about 14%. The condensate which is formed on the product surfaces is sufficient to prevent the product pieces from sticking to one another during the steaming, and no excess water nor saturated steam should be used in the steaming stage as this would result in total denaturation of the protein and total gelatinization of the starch, under the defined conditions and with products 0.3 to 0.7 mm thick, making an "al dente" texture unachievable. This is due to the fact that the rate and degree of protein and starch conversion are dependent upon moisture availability and temperature. In general terms the greater the moisture content, the lower the temperature needed to effect denaturation of the protein and gelatinization of the starch. In the method of the invention the moisture content is sufficiently limited and the temperature of the steam is at such a level that partial denaturation and gelatinization can be achieved.

Semolina may be used instead of wheat flour or a combination of semolina and wheat flour may be mixed with water as the starting material.

Figure 2:
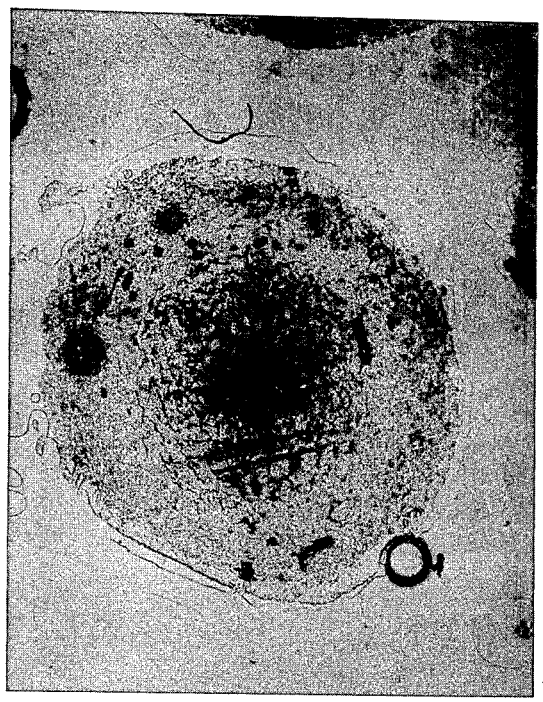
FIG. 2 is a photomicrograph taken under nonpolarized light showing a conventional spaghetti in cross section at x32 magnification cooked for ten minutes, (to "al dente").
Figure 3:
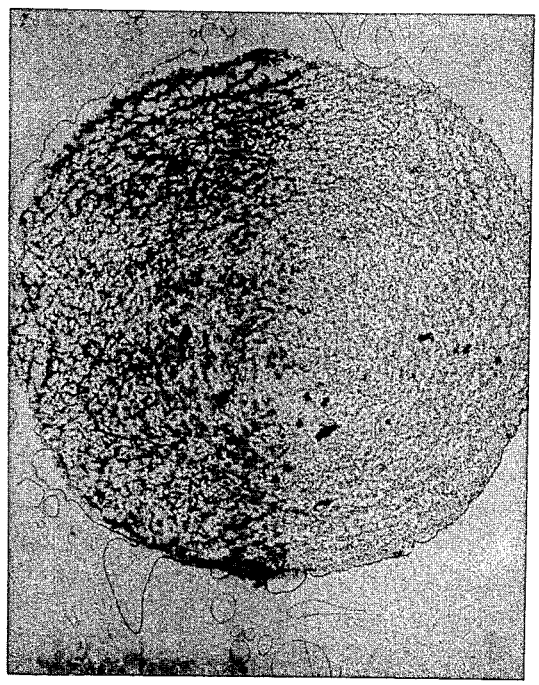
FIG. 3 is a photomicrograph taken under nonpolarized light showing a conventional spaghetti in cross section at x32 magnification cooked for fifteen minutes (overcooked with same loss of texture).
Figure 4:
FIG. 4 is a photomicrograph taken under polarized light showing a conventional spaghetti in cross section at x32 magnification cooked for ten minutes (to "al dente").
Figure 5:
FIG. 5 is a photomicrograph taken under polarized light showing in cross section at x32 magnification a noodle made in accordance with this invention and rehydrated in hot water for five minutes.

FIGS. 1, 2 and 3 are light photomicrographs, taken using nonpolarized light, showing conventional spaghetti in cross section at x32 magnification, cooked in boiling water for periods of five minutes, ten minutes and fifteen minutes, respectively. FIG. 4 is similar to FIG. 2 except for being taken under polarized light—that is, it is a photomicrograph taken using polarized light showing conventional spaghetti in cross section at x32 magnification cooked for a period of ten minutes. In FIGS. 1, 2 and 4 the spaghetti exhibits a central zone differing in character from the surrounding outer zone. This difference in the character of the central zone, as seen in FIGS. 1, 2 and 4, is due to the central zone including a substantial amount of ungelatinized starch whereas most or all of the starch in the outer zone has been gelatinized In FIG. 4 the inner zone or core is more apparent because a property of ungelatinized starch is to show birefringence. when viewed by polarized light. In FIG. 3 the inner zone or core no longer appears because of its starch having been gelatinized by the longer period of cooking. In FIGS. 2 and 4 the spaghetti is of the desirable "al dente" texture. The polarized light microphotograph of FIG. 5 shows a quick rehydrating noodle produced in accordance with the method of this invention and cooked by pouring boiling water over it and allowing it to stand in such water for five minutes in a covered pot without adding additional heat. As can be seen by comparing FIG. 5 with FIG. 4 the product of FIG. 5 exhibits partial gelatinization of the starch, of a degree similar to that of the product of FIG. 4, giving it an "al dente" texture. That is, the product of FIG. 5 has an outer zone in which most or all of the starch is gelatinized while retaining an inner zone or core in which a substantial amount of the starch remains ungelatinized. In the microphotographs of FIGS. 1 to 5 the degree of denaturation of the protein in various zones of the product is not evident, but it is a well established fact that during cooking gelatinization of starch is accompanied (where applicable) by protein denaturation. Therefore, the relative denaturation of the protein in the inner and outer zones of the product is at least roughly similar to the relative gelatinization of the starch in the various products shown by FIGS. 1 to 5.

We claim:

1. A rapidly rehydratable pasta product having an outer zone in which most or all of the protein is denatured and most or all of the starch is gelatinized and having a central core in which a substantial amount of the protein is undenatured and a substantial amount of the starch is ungelatinized, said pasta product being produced by preparing a mixture consisting substantially entirely of wheat flour and water, having a moisture content of between 28% and 40%, extruding the mixture through a die and cutting it into lengths to form a cut product having a thickness between 0.3 and 0.7 millimeters, and then simultaneously cooking and drying said cut product by subjecting said cut product to superheated steam in the absence of water at a temperature between 102° C. and 140° C. for from seven to twenty minutes to yield a shelf-stable product without cracking or checking, said cut product being left in an unexpanded state at all times throughout said method and at the start of said simultaneous cooking and drying step having a moisture content of between 24% and 40%, said simultaneous cooking and drying step reducing the moisture content of said cut product to below 14% and leaving each piece of said product with an outer zone in which most or all of its protein is denatured and most or all of its starch is gelatinized and with a central core in which a substantial amount of the protein is undenatured and a substantial amount of the starch is ungelatinized, said outer zone and central core being of such sizes that said product is rapidly rehydratable in boiling water in under ten minutes because of the presence of said outer zone and yet after such rehydration exhibits a definite al dente texture because of the presence of said central core.

2. A method of producing a rapidly rehydratable pasta which includes preparing a mixture consisting substantially entirely of wheat flour and water, having a moisture content of between 28% and 40%, extruding the mixture through a die and cutting it into lengths to form a cut product having a thickness between 0.3 and 0.7 millimeters, and then simultaneously cooking and drying said cut product by subjecting said cut product to superheated steam in the absence of water at a temperature between 102° C. and 104° C. for from seven to twenty minutes to yield a shelf-stable product without cracking or checking, said cut product being left in an unexpanded state at all times throughout said method and at the start of said simultaneous cooking and drying step having a moisture content of between 24% and 40%, said simultaneous cooking and drying step reducing the moisture content of said cut product to below 14% and leaving each piece of said product with an outer zone in which most or all of its protein is denatured and most or all of its starch is gelatinized and with a central core in which a substantial amount of the protein is undenatured and a substantial amount of the starch is ungelatinized, said outer zone and central core being of such sizes that said product is rapidly rehydratable in boiling water in under ten minutes because of the presence of said outer zone and yet after such rehydration exhibits a definite al dente texture because of the presence of said central core.

* * * * *